(12) United States Patent
Park et al.

(10) Patent No.: US 9,288,840 B2
(45) Date of Patent: Mar. 15, 2016

(54) MOBILE TERMINAL AND CONTROLLING METHOD THEREOF USING A BLOWING ACTION

(71) Applicant: LG ELECTRONICS INC., Seoul (KR)

(72) Inventors: Mihyun Park, Seoul (KR); Hyejin Eum, Seoul (KR); Saeyoung Ahn, Seoul (KR); Hongjo Shim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 13/911,619

(22) Filed: Jun. 6, 2013

(65) Prior Publication Data

US 2014/0004908 A1 Jan. 2, 2014

(30) Foreign Application Priority Data

Jun. 27, 2012 (KR) .................. 10-2012-0069325
Aug. 22, 2012 (KR) .................. 10-2012-0091611

(51) Int. Cl.
| | |
|---|---|
| *H04M 1/00* | (2006.01) |
| *H04M 1/66* | (2006.01) |
| *H04M 3/00* | (2006.01) |
| *H04W 88/02* | (2009.01) |
| *G06F 3/01* | (2006.01) |
| *H04M 1/725* | (2006.01) |

(52) U.S. Cl.
CPC .............. *H04W 88/02* (2013.01); *G06F 3/011* (2013.01); *H04M 1/72522* (2013.01); *H04M 1/72547* (2013.01); *H04M 2250/12* (2013.01)

(58) Field of Classification Search
CPC ............ G01N 33/497–33/4972; G01N 33/98; G01N 2001/2244; G01N 2033/4975; G01N 2033/4977; B60K 28/063; B60W 2540/24; A61B 5/082; A61B 5/083
USPC ........... 455/411, 414.1, 418, 556.1, 565–567; 73/23.3; 24/84; 10/543

See application file for complete search history.

(56) References Cited

U.S. PATENT DOCUMENTS

| | | | |
|---|---|---|---|
| 4,738,333 A * | 4/1988 | Collier et al. .................. 180/272 |
| 8,363,820 B1 * | 1/2013 | Graham ................... 379/390.03 |
| 2006/0085183 A1 * | 4/2006 | Jain ................. 704/233 |
| 2006/0107225 A1 * | 5/2006 | Jones et al. ................... 715/764 |
| 2006/0167691 A1 * | 7/2006 | Tuli .............................. 704/258 |
| 2007/0150842 A1 * | 6/2007 | Chaudhri et al. ............. 715/863 |
| 2009/0082884 A1 | 3/2009 | Bonnat |
| 2010/0079370 A1 | 4/2010 | Kim et al. |
| 2010/0090564 A1 | 4/2010 | Oh et al. |

(Continued)

FOREIGN PATENT DOCUMENTS

| | | |
|---|---|---|
| CN | 101719956 A | 6/2010 |
| EP | 2175625 A1 | 4/2010 |
| EP | 2293530 A1 | 3/2011 |

*Primary Examiner* — Rafael Pérez-Gutiérrez
*Assistant Examiner* — Mark G. Pannell
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a first sensor configured to detect a blowing action on the mobile terminal; a second sensor configured to detect an input action of a user; and a controller configured to execute a prescribed function on the mobile terminal when detecting the input of the user, detecting the blowing action on the mobile terminal, and detecting a release of the input action.

12 Claims, 18 Drawing Sheets

(56) References Cited

U.S. PATENT DOCUMENTS

| | | | |
|---|---|---|---|
| 2010/0227640 A1* | 9/2010 | Kim et al. | 455/550.1 |
| 2011/0004327 A1 | 1/2011 | Bonnat | |
| 2011/0041086 A1* | 2/2011 | Kim et al. | 715/764 |
| 2011/0237220 A1* | 9/2011 | Matsuoka | 455/411 |
| 2012/0054657 A1* | 3/2012 | Nurmi | 715/769 |
| 2012/0172022 A1* | 7/2012 | Son et al. | 455/418 |
| 2012/0192121 A1* | 7/2012 | Bonnat | 715/863 |
| 2014/0016668 A1* | 1/2014 | Boni et al. | 374/143 |
| 2014/0055346 A1* | 2/2014 | Boni et al. | 345/156 |

\* cited by examiner

FIG. 11
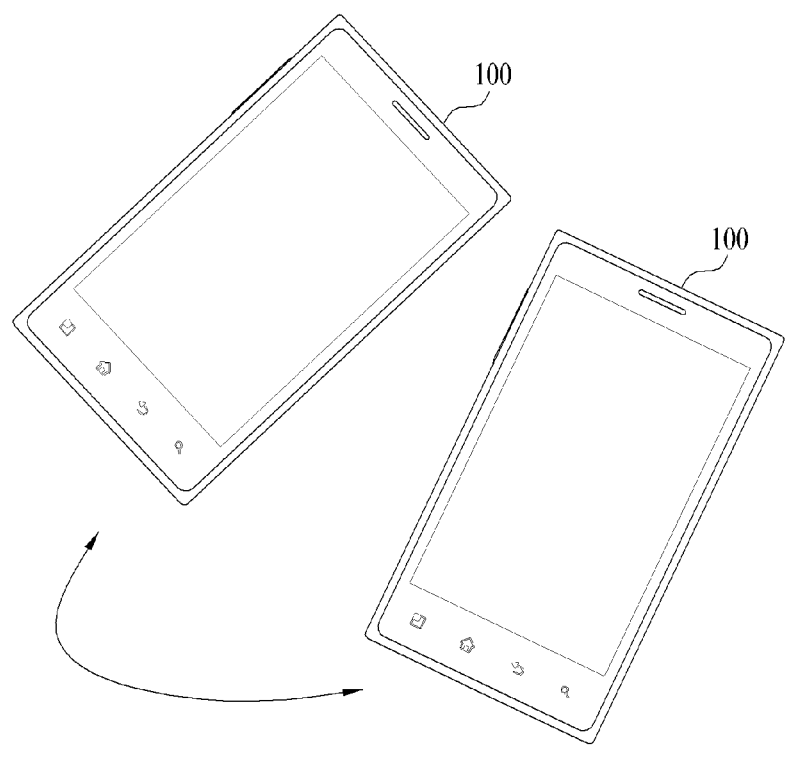
(a)
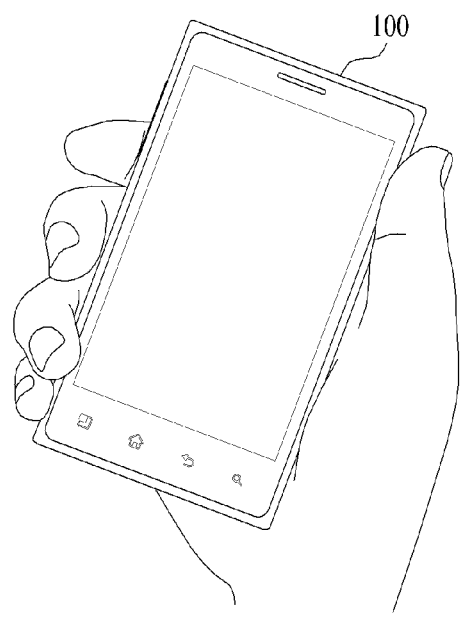
(b)

MOBILE TERMINAL AND CONTROLLING METHOD THEREOF USING A BLOWING ACTION

Pursuant to 35 U.S.C. §119(a), this application claims the benefit of earlier filing date and right of priority to Korean Application No. 10-2012-0069325 filed on Jun. 27, 2012 and Korean Application No. 10-2012-0091611 filed on Aug. 22, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, the mobile terminals can be further classified into handheld terminals and vehicle mount terminals.

Recently, the number of mobile terminals provided with temperature and humidity sensors is increasing to provide more information to users of the mobile terminals. Therefore, the demand for developing a method of facilitating a terminal to be manipulated using the temperature sensor and the humidity sensor is increasing.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a temperature sensor and a humidity sensor can be used as a user input mechanism.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention includes a temperature and humidity sensor configured to detect at least one of a humidity and a temperature, a secondary sensor configured to detect an input of a user, and a controller setting a first interval in accordance with at least one of the detected humidity and the detected temperature, setting a second interval based on the detected user's input, and performing a prescribed function of the mobile terminal based on a third interval having the first and second intervals overlap with each other therein.

In another aspect of the present invention, a method of controlling a mobile terminal according to an embodiment of the present invention includes arranging at least one virtual step on the touchscreen, outputting the at least one unlock object to each of the at least one virtual step, and if one of the at least one virtual step is selected via the touchscreen, removing the at least one unlock object output to the selected virtual step in response to a time for maintaining the third interval, wherein the screen lock unlocking step comprises the step of if the pattern of the removed unlock object on each of the at least one virtual step is identical to the preset pattern, unlocking the screen lock of the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 11 is a diagram illustrating examples of a secondary sensing unit 143 according to an embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
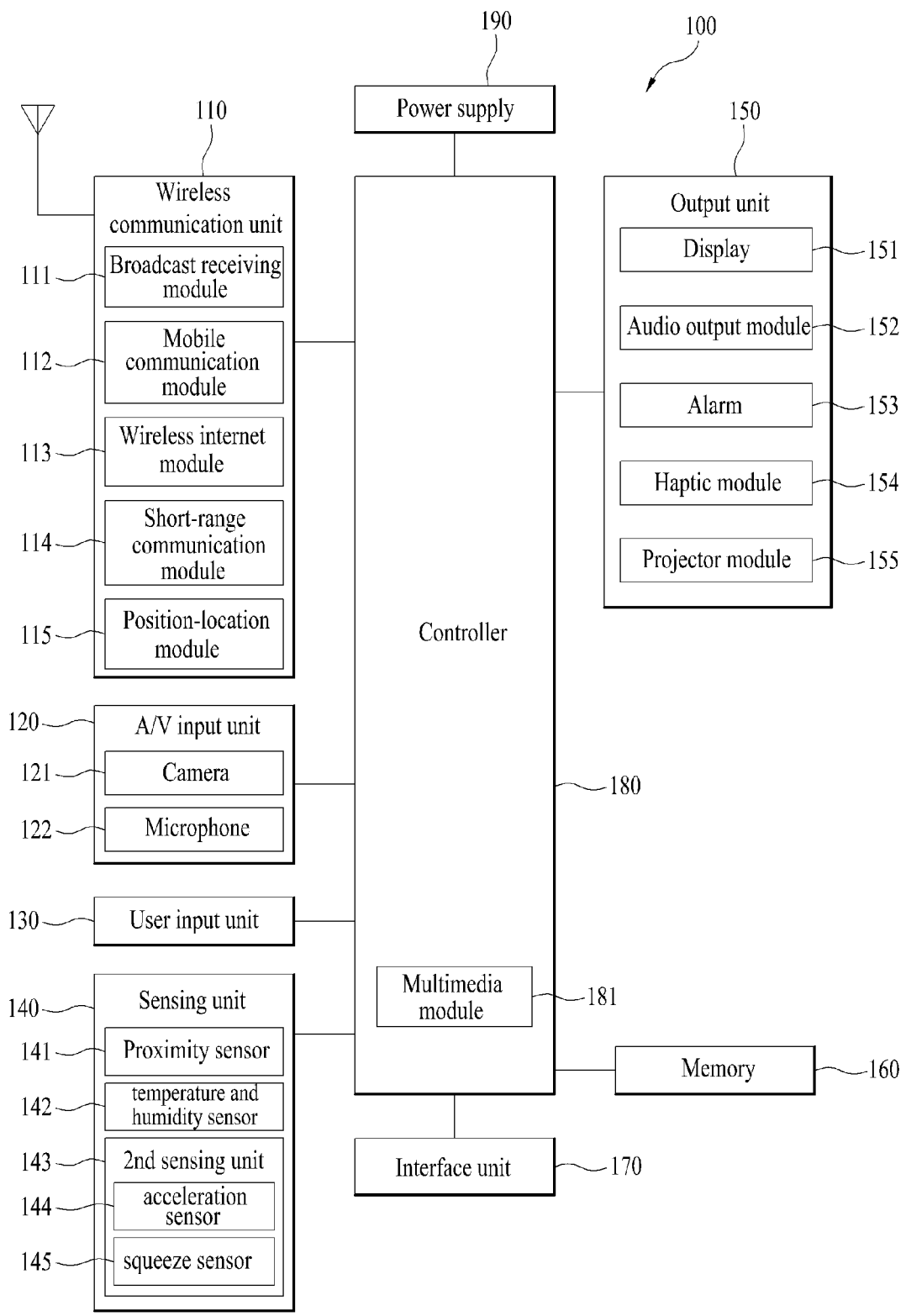
FIG. 1 is a block diagram of a mobile terminal according to one embodiment of the present invention.

FIG. 1 is a block diagram of a mobile terminal 100 in accordance with an embodiment of the present invention. As shown in FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel includes a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation. The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information includes an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), and WCDMA (Wideband CDMA) and so on. Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141, and a temperature and humidity sensor 142. The temperature and humidity sensor 142 is described in more detail later.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 includes one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. Further, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 includes a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
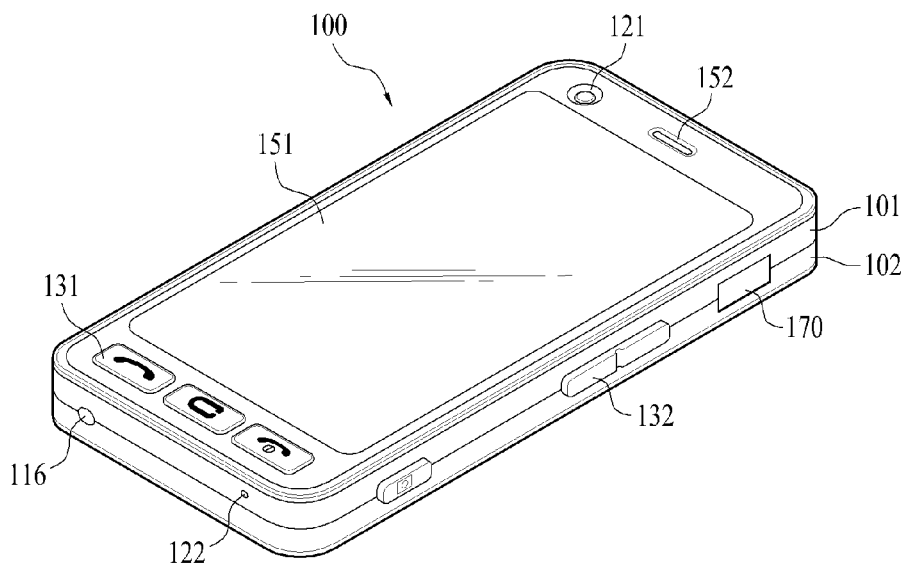
FIG. 2A is a front perspective diagram of a mobile terminal according to one embodiment of the present invention.

FIG. 2A is a front perspective diagram of a mobile terminal according to one embodiment of the present invention. The mobile terminal 100 shown in the drawing has a bar type terminal body. However, the mobile terminal 100 may be implemented in a variety of different configurations. Examples of such configurations include a folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102.

Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
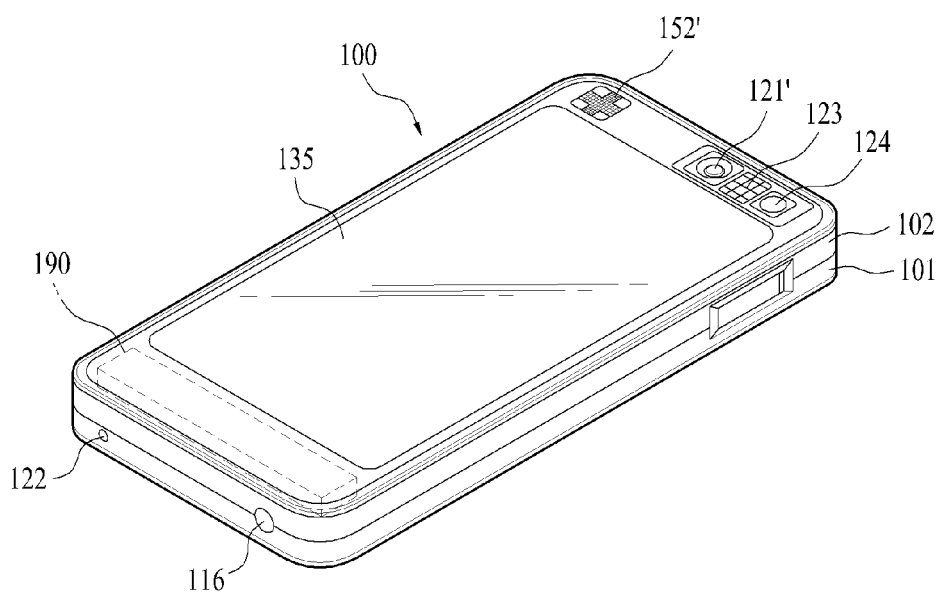
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

Figure 3:
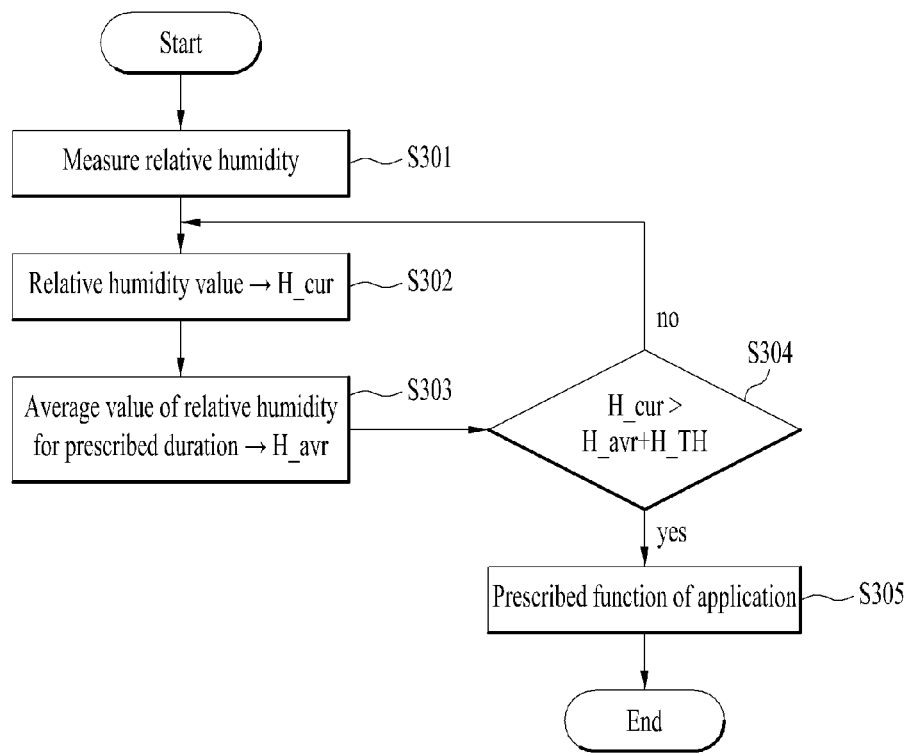
FIG. 3 is a flowchart illustrating a method of recognizing breath by detecting relative humidity according to one embodiment of the present invention.

The touchpad 135 is activated by interconnecting with the display 151 of the front case 101. The touchpad 135 can be provided in rear of the display 151 in parallel. The touchpad 135 can have a size equal to or smaller than that of the display 151. A retractable antenna 116 can also be provided Next, FIG. 3 is a flowchart illustrating a method of recognizing breath by detecting a relative humidity according to one embodiment of the present invention. Referring to FIG. 3, a temperature and humidity sensor 142 detects a relative humidity (S301).

The controller 180 inserts a value of the relative humidity detected by the temperature and humidity sensor 142 into H_cur (S302). Because the humidity of the human breath is high, if a user blows on the temperature and humidity sensor 142, the value of the relative humidity measured by the temperature and humidity sensor 142 may increase. Hence, if the value of the relative humidity measured by the temperature and humidity sensor 142 is greater than a prescribed threshold, the controller 180 can detect that human breath is blown thereon.

However, in some cases, the humidity may increase depending on a location the mobile terminal 100 is located even though the user does not blow on the sensor 142. For instance, a value of relative humidity measured by the temperature and humidity sensor 142 in such a place as a swimming pool, a sauna and the like may exceed a prescribed threshold. If so, the controller 180 can improperly detect that a human breath is blown thereon.

Thus, in order to correctly detect human breath, an average humidity value for a prescribed duration can be used. That is, the controller 180 calculates an average value of relative humidity measured for a prescribed duration by the temperature and humidity sensor 142. If the measured relative humidity value is greater than the calculated average value by a prescribed threshold, the controller 180 can detect that human breath is blown thereon.

Thus, if the calculated average value is used in detecting human breath, although the mobile terminal 100 is located in a highly humid place, the controller 180 can properly recognize the human breath. Subsequently, the controller 180 calculates an average value of the relative humidity detected by the temperature and humidity sensor 142 for the prescribed duration and then inserts the calculated average value into H_avr (S303).

The controller 180 compares the calculated average value of H_avr to the currently measured relative humidity value of H_cur (S304). If the value of H_cur is greater than a value resulting from adding a prescribed threshold H_TH to the value of H_avr, the controller 180 can detect that human breath is blown thereon.

If the controller 180 detects that human breath is blown thereon (Yes in S304), the controller 180 activates a prescribed function of an application. In this instance, the prescribed function of the application includes a function in response to the recognition of the human breath. The prescribed function of the application is described in detail with reference to FIGS. 4 to 7. If the controller 180 does not detect that human breath is blown thereon (No in S304), the controller 180 goes back to step S301.

Figure 4:
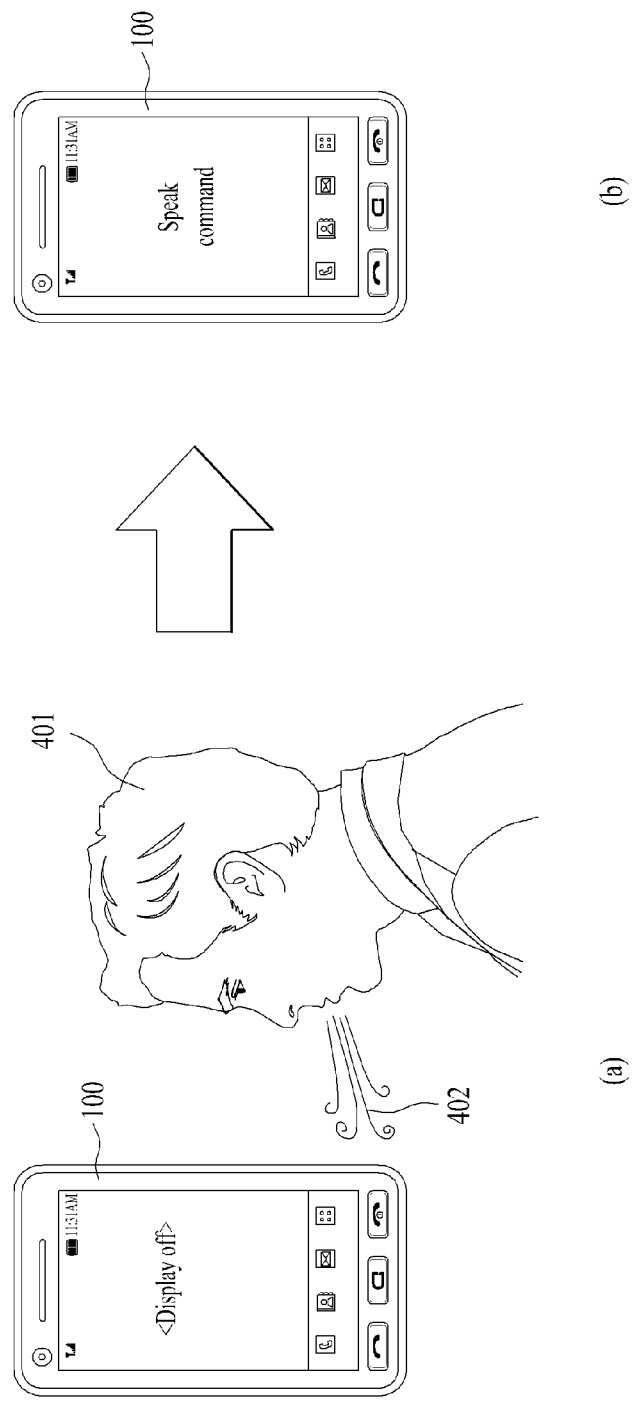
FIG. 4 is a diagram illustrating a method of activating a function of a mobile terminal by recognizing human breath according to one embodiment of the present invention.

Next, FIG. 4 is a diagram illustrating a method of activating a function of a mobile terminal by recognizing human breath according to one embodiment of the present invention. Referring to FIG. 4, the mobile terminal 100 can detect a humidity and temperature to recognize the breath 402 of a user 401. In addition, the user 401 can control the mobile terminal 100 using their breath. In FIG. 4(*a*), a display of the mobile terminal 100 is turned off. When the display of the mobile terminal 100 is turned off, the user 401 can blow a breath 402 on the humidity sensor and the temperature sensor 142 of the mobile terminal 100.

In addition, because locations of the humidity sensor and the temperature sensor 142 may be different from each other depending on a design of the mobile terminal 100, this example assumes that the user 401 blows the breath 402 on the locations of the humidity and temperature sensors 142. Further, as human breath has a high humidity and high temperature relatively in general, when the breath 402 comes in contact with the mobile terminal 100, the humidity detected by the humidity sensor and the temperature detected by the temperature sensor instantly increase. The corresponding changes of the humidity and temperature are described with reference to FIG. 5 as follows.

Figure 5:
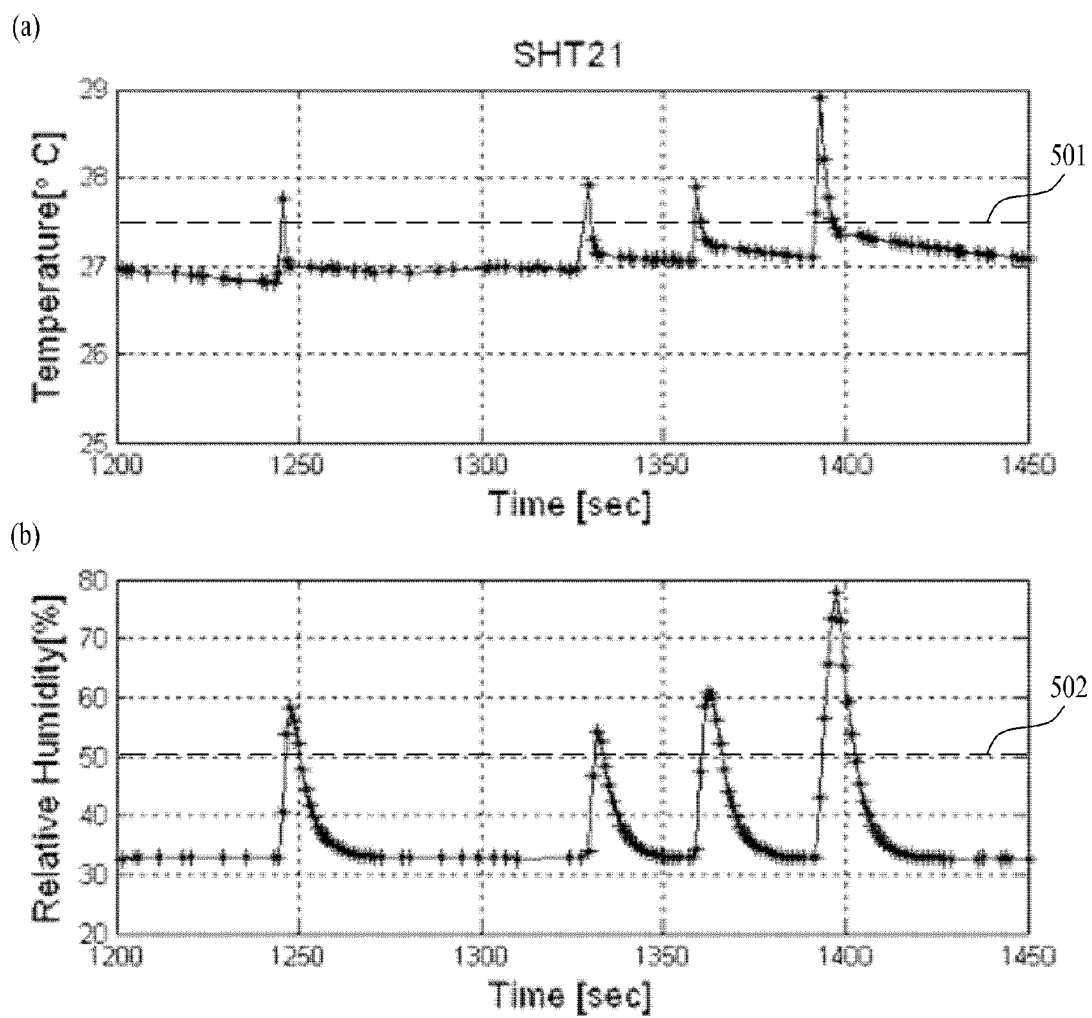
FIG. 5 is a diagram illustrating changes of humidity and temperature detected when human breath is blown on a humidity sensor and a temperature sensor.

In particular, FIG. 5 is a diagram illustrating changes of humidity and temperature detected when human breath is blown on a humidity sensor and a temperature sensor. In particular, FIG. 5(*a*) shows a change of temperature detected by a temperature sensor depending on time. In addition, FIG. 5(*b*) shows a change of humidity detected by a humidity sensor depending on time. If the humidity detected by the humidity sensor is equal to or greater than a first prescribed value 502 and if the temperature detected by the temperature sensor is equal to or greater than a second prescribed value 501, the controller 180 can detect that human breath is input.

Referring to FIG. 5, human breath is blown on the sensors four times. In particular, the four breaths are blown at 1,250 ms, 1,335 ms, 1,365 ms and 1,395 ms, respectively. Regarding the changes of temperature and humidity for the four breaths, it can be observed that both of the temperature and the humidity abruptly increase. Regarding the changes of the temperature, it can be observed that the temperature increases over the second prescribed value 501 in all the four cases.

Regarding the changes of the humidity, it can be observed that the humidity increases over the first prescribed value 502 in all the four cases. Hence, the controller 180 can detect that human breath is input if numerical values of the temperature and humidity measured by the temperature sensor and the humidity sensor are equal to or greater than prescribed values, respectively.

Referring again to FIG. 4, if the mobile terminal 100 detects the breath 402, the display is turned on and an active screen of a speech recognition mode is then displayed (FIG. 4(*b*)). In this instance, the speech recognition mode is a state in which a prescribed function of a mobile terminal can be executed if a speech of a user of the mobile terminal is recognized. However, when the breath is detected 402, any other functions can be executed in accordance with settings of the mobile terminal 100 as well as the speech recognition mode.

Therefore, according to one embodiment of the present invention, the user 401 of the mobile terminal 100 can activate a speech recognition mode of the mobile terminal 100 by blowing into the mobile terminal 100 conveniently without performing a separate manipulation to activate the speech recognition mode.

Figure 6:
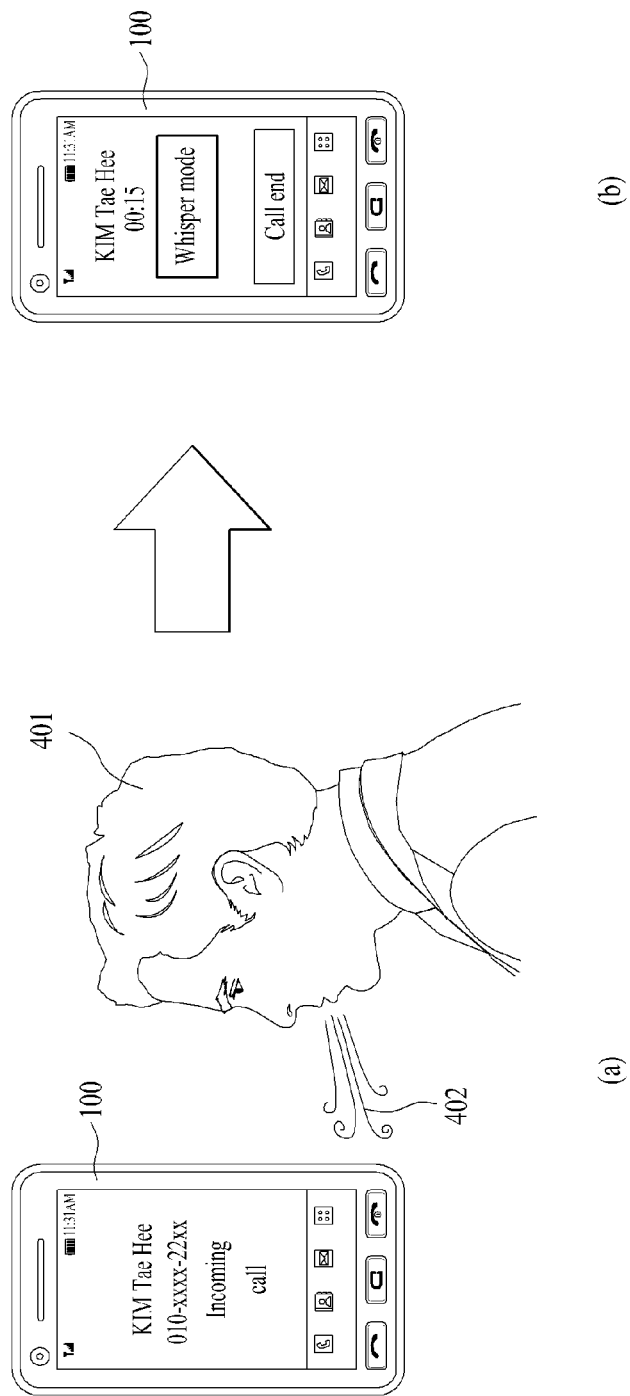
FIG. 6 is a diagram illustrating a method of activating a prescribed function by recognizing user's breath according to another embodiment of the present invention.

Next, FIG. 6 is a diagram illustrating a method of activating a prescribed function by recognizing a user's breath according to another embodiment of the present invention. In particular, FIG. 6(a) shows a screen for displaying that the mobile terminal 100 is receiving an incoming call from a person named 'KIM Tae Hee.'

Occasionally, when the phone call is being received, the user 401 may be in a special situation. For instance, the user 401 is in the middle of a meeting or in a quiet library. If the user 401 answers the phone call in such a situation, a sound of a counterpart propagates into the silent space to annoy other people. Hence, when the phone call is received, the user 401 may want to receive the phone call in a state that a whisper mode is automatically entered.

FIG. 6(b) shows that when the phone call is answered using the breath 402, the whisper mode is automatically entered for the phone call. In this instance, the whisper mode is a mode that has a setting suitable for receiving a phone call in a quiet space. In particular, in the whisper mode, the user's voice is amplified and a voice level of a phone call counterpart is lowered.

That is, in the whisper mode, an electric signal converted by a microphone is amplified and then output via the wireless communication unit 110 and an electrical signal received via the wireless communication unit 100 is attenuated and then output to the audio output unit 152. Thus, if the user receives the phone call in the whisper mode, the counterpart's voice is prevented from reverberating in a quiet space. In addition, the user 401 can speak with the counterpart despite speaking in a quiet voice. Thus, because the user 401 can utilize the breath as a single control input, the user can easily control the mobile terminal 100 using their breath.

Figure 7:
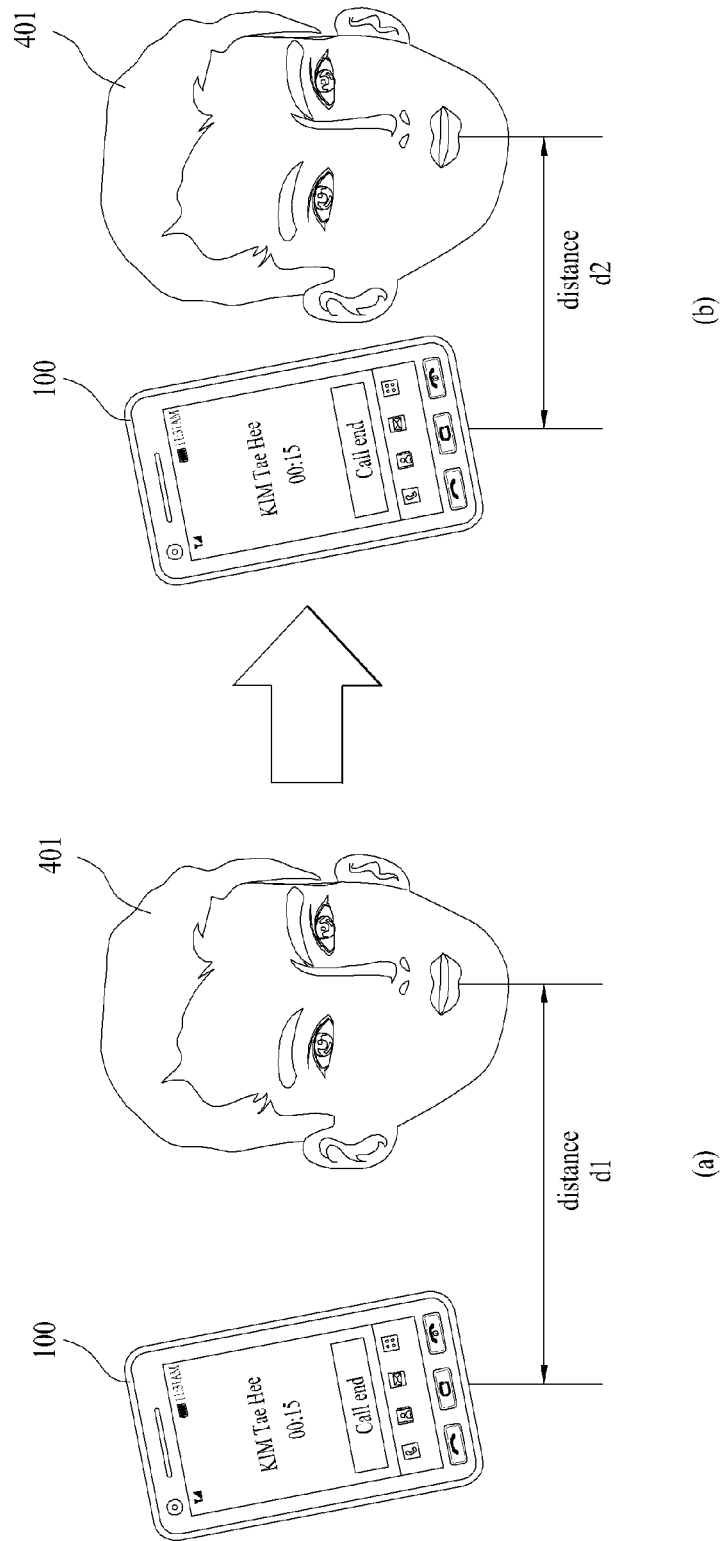
FIG. 7 is a diagram illustrating a method of enhancing a quality of a call using temperature and humidity detected during the call.

Next, FIG. 7 is a diagram illustrating a method of enhancing a quality of a call using temperature and humidity detected during the call via a mobile terminal. Referring to FIG. 7, a user is talking on their mobile terminal 100. In FIG. 7(a), a distance between a location of the mouth of the user 401, who is talking on the mobile terminal 100, and a location of the mobile terminal 100 is set to d1. In FIG. 7(b), the distance is set to d2. In this instance, d1 is greater than d2.

In some instances, the user 401 of the mobile terminal 100 may speak on the mobile terminal 100 in very loud environment. For instance, the user 401 of the mobile terminal 100 may speak one the mobile terminal 100 in a night club, a concert or the like. Thus, a counterpart of the call may have difficulty in precisely hearing the words spoken by the user 401 of the mobile terminal 100. Particularly, if the distance between the mobile terminal 100 and the user 401 is considerably great, as shown in FIG. 7(a), it is difficult to have a conversation.

In this instance, referring to FIG. 7(b), the user 401 holds the microphone of the mobile terminal 100 closer to his mouth. Thus, if the microphone of the mobile terminal 100 gets closer to the mouth of the user 401, the voice of the user 401 can be more clearly delivered to the counterpart of the call.

Moreover, when the user 401 holds the microphone closer to his mouth, as shown in FIG. 7(b), and if the user's voice is amplified by detecting such an action, the user's voice may be more clearly delivered to the counterpart. In particular, if the temperature sensor and the humidity sensor 142 are situated nearby the microphone 122 of the mobile terminal 100, the temperature and humidity detected when the microphone 122 is closer to the mouth of the user 401 increases.

Hence, if the numeral values of the detected humidity and temperature are equal to or greater than prescribed values, respectively, the controller 180 can detect that the user's mouth and the microphone 122 are closer to each other. If detecting that the user's mouth and the microphone 122 are closer to each other, the controller 180 can amplify and deliver the user's voice to the call counterpart.

Consequently, when the user 401 intends to amplify his voice in accordance with a situation, in which the user 401 is speaking on the mobile terminal 100, the user can place his mouth closer to the microphone 122 to speak. Therefore, according to one embodiment of the present invention, the user's voice is advantageously amplified by only placing his mouth closer to the microphone 122 without a separate manipulation.

As mentioned in the description with reference to FIG. 3, the controller 180 can detect the human breath using a change of relativity humidity. However, detecting the human breath using the relative humidity measured via the temperature and humidity sensor sometimes has a problem, which is described with reference to FIG. 8 as follows.

Figure 8:
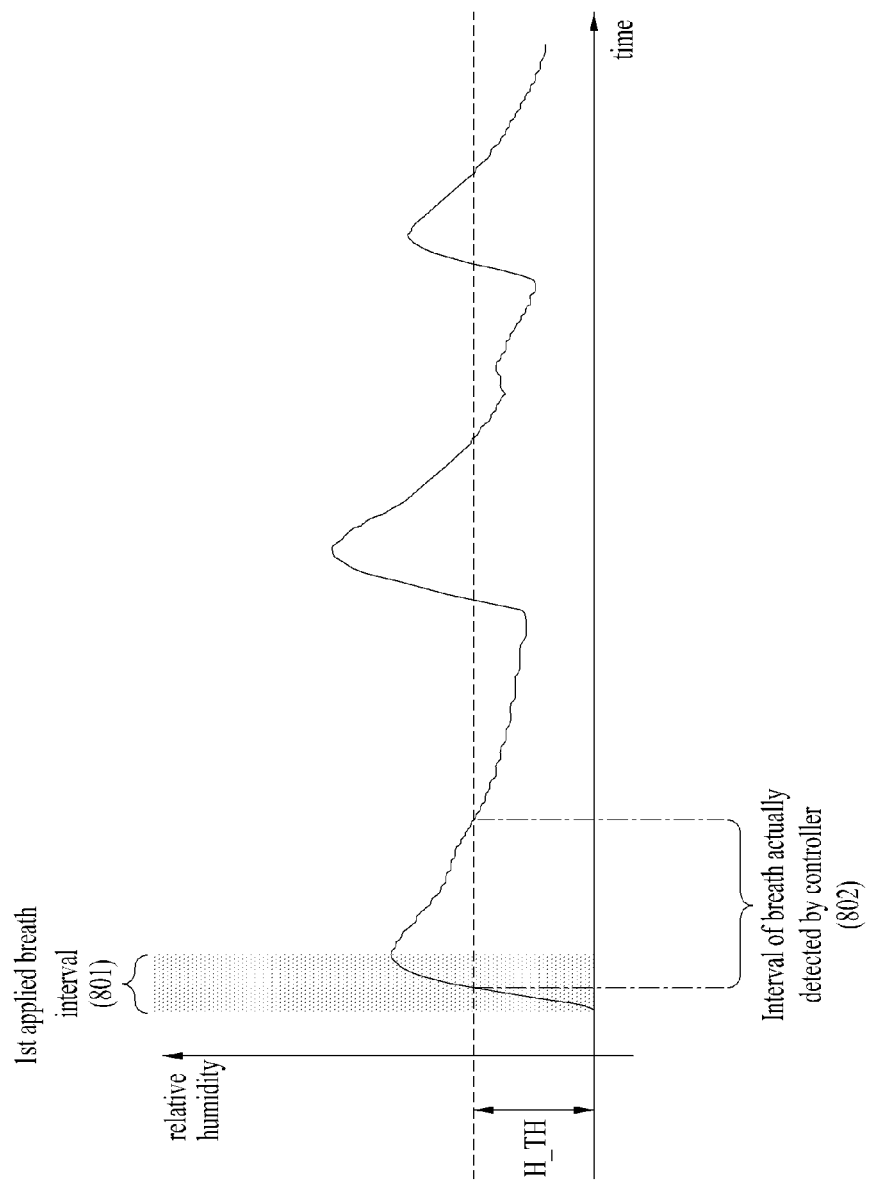
FIG. 8 is a diagram illustrating a problem of a method of detecting human breath using relative humidity, in which a change of the relative humidity detected while applying human breath is shown.

In particular, FIG. 8 is a diagram illustrating a problem of a method of detecting human breath using relative humidity, in which a change of the relative humidity detected while applying human breath is shown. In FIG. 8, an x-axis indicates time and y-axis indicates relative humidity.

Referring to FIG. 8, the human breath is applied three times. A reference number 801 indicates an interval of a first applied breath. The breath is represented as the interval to indicate that the breath is applied during the interval instead of being applied instantly. During the first breath applied interval 801, a value of the relative humidity measured by the temperature and humidity sensor 142 may increase as shown in the drawing.

If the value of the measured relative humidity exceeds a prescribed threshold H_TH, the controller 180 can detect that the human breath is applied. Alternatively, as mentioned in the foregoing description with reference to FIG. 3, if the value of the relative humidity, which is measured using the average value of the humidity during a prescribed time, becomes greater than a value resulting from adding the prescribed threshold H_TH to the average value, the controller 180 can detect that the human breath is applied.

However, the human breath recognized by the controller 180 is recognized not through a specific time but through a breath interval 802, which can be observed from the graph shown in FIG. 8. Ideally, an interval of human breath recognized by the controller 180 should actually be the interval 801 of applying the human breath. However, the human breath interval 802 recognizable by the controller 180 may have a difference from the interval 801. The reason why the recognition is different is because the humidity has a property of not changing instantly.

The above-generated interval error may become an obstacle in utilizing the human breath as an input mechanism. For instance, although a user wants to stop the input of the breath, the controller 180 may incorrectly recognize that the human breath keeps being input.

In order to correct the difference between the interval 801 of the actually applied breath and the interval 802 of the breath recognized by the controller 802, another embodiment of the present invention detects human breath using an additional sensor. This method is described in more detail with reference to FIGS. 9 and 10 as follows. In addition, the additional sensor is hereinafter named a secondary sensing unit.

Figure 9:
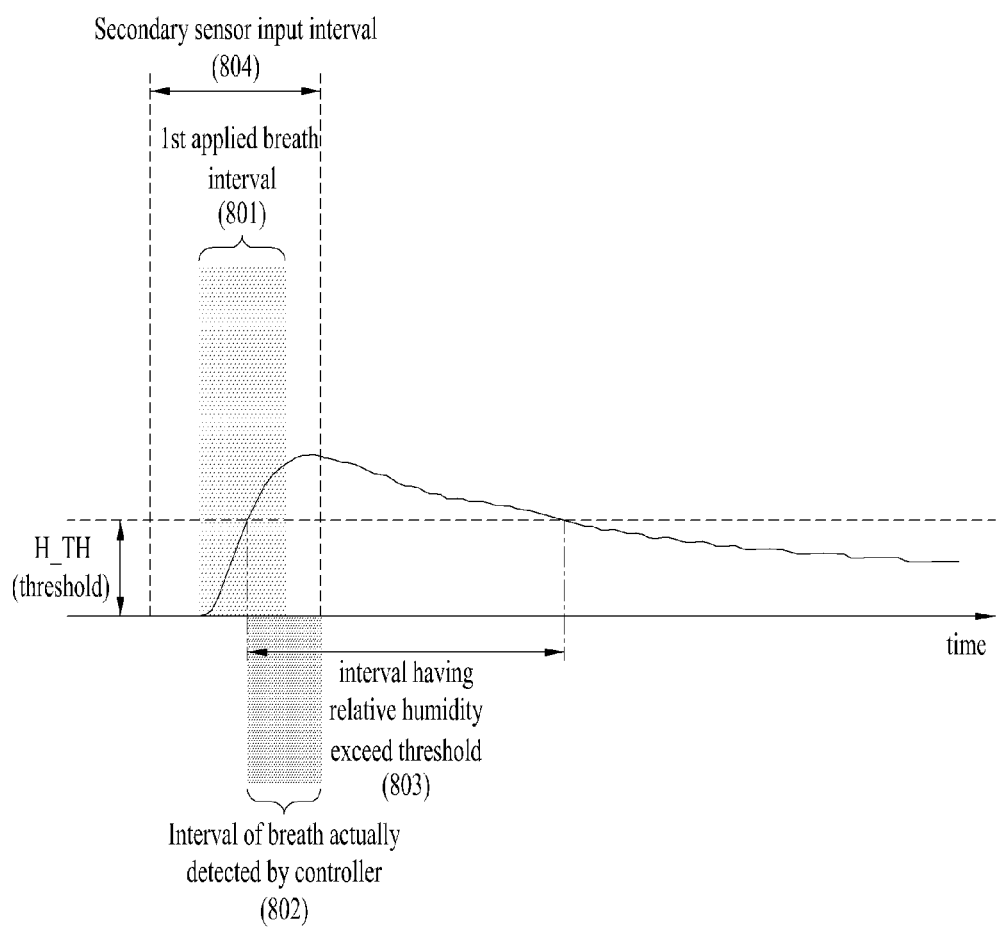
FIG. 9 is a diagram for describing a method of detecting that user's breath is input using relative humidity and a secondary sensing unit 143 according to another embodiment of the present invention.

In particular, FIG. 9 is a diagram illustrating a method of detecting that the user's breath is input using relative humidity and a secondary sensing unit 143 according to another embodiment of the present invention. FIG. 9 shows the same humidity graph shown in FIG. 8, except the y-axis is omitted.

FIG. 9 is different from FIG. 8 in having an input interval 804 of a secondary sensing unit 143. In FIG. 8, the controller 180 recognizes an interval, in which relative humidity exceeds the threshold, as the breath interval 802 detected by the controller 180. However, in the present embodiment, the interval 802 and the interval 803 are separately recognized.

The input interval 804 of the secondary sensing unit 143 may be set by a user. For example, the secondary sensing unit 143 includes a squeeze sensor 145, an acceleration sensor 144 and the like. In addition, the input interval of the secondary sensing unit 143 includes the interval in which the user maintains the input using the sensors.

According to the embodiment of the present invention, the controller 180 may set the breath interval 802 detected by the controller 180 to the interval in which the interval 803 (where the relative humidity exceeds the threshold) and the input interval 804 of the secondary sensing unit 143. Thus, according to the embodiment of the present invention, the error between the actually applied breath interval 801 and the breath interval 802 detected by the controller 180 can be reduced.

The error of the actual interval occurs not at a start point of the interval but at an end point of the interval. Hence, according to another embodiment of the present invention, if a user can designate the interval end point using the secondary sensing unit 143, the error can be reduced as small as possible. One example of a flowchart for activating an application using the aforementioned secondary sensing unit 143 is described with reference to FIG. 10 as follows.

Figure 10:
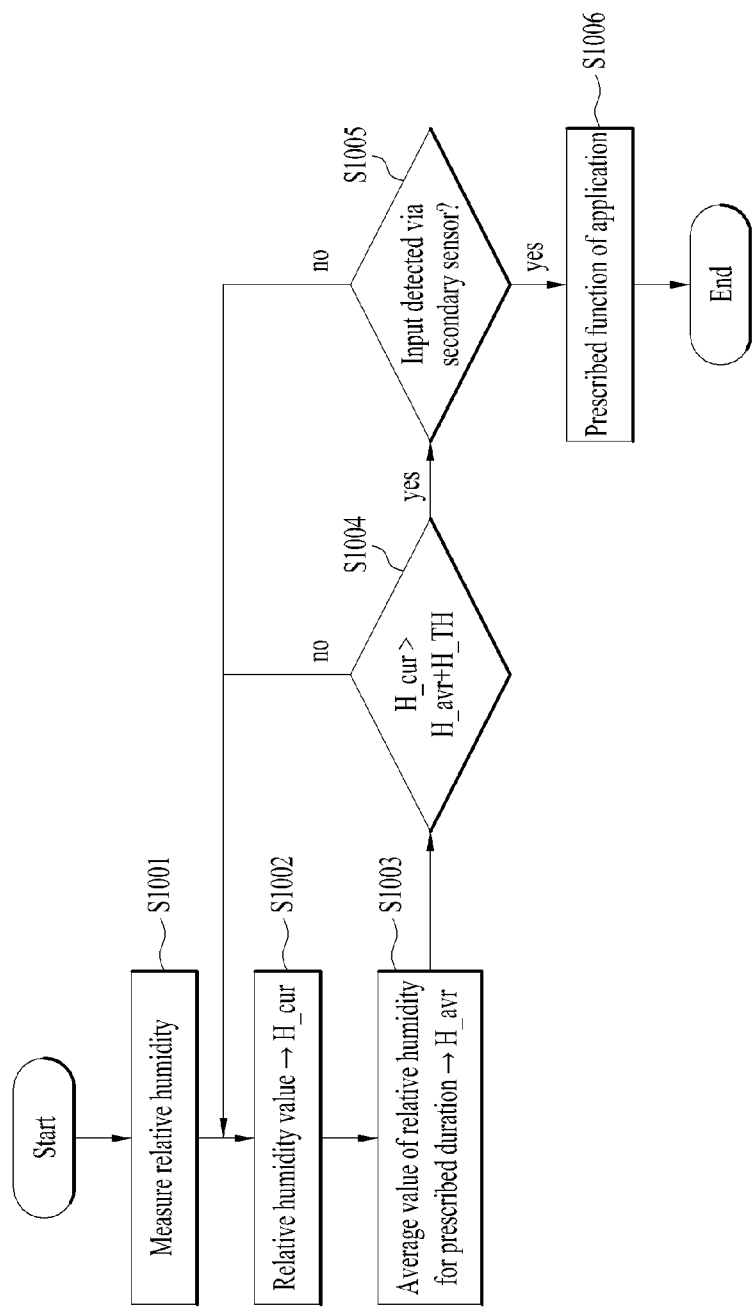
FIG. 10 is a flowchart for a method of detecting that user's breath is input using relative humidity and a secondary sensing unit 143 according to another embodiment of the present invention.

In particular, FIG. 10 is a flowchart illustrating a method of detecting that the user's breath is input using relative humidity and the secondary sensing unit 143 according to another embodiment of the present invention. Referring to FIG. 10, a temperature and humidity sensor 142 detects the relative humidity (S1001).

The controller 180 inserts a value of the relative humidity detected by the temperature and humidity sensor 142 into H_cur (S1002). Subsequently, the controller 180 calculates an average value of the relative humidity detected by the temperature and humidity sensor 142 for the prescribed duration and then inserts the calculated average value into H_avr (S1003).

The controller 180 then compares the calculated average value of H_avr to the currently measured relative humidity value of H_cur (S1004). If the value of H_cur is greater than a value resulting from adding a prescribed threshold H_TH to the value of H_avr, the controller 180 detects that human breath is applied.

If the controller 180 detects that human breath is applied (Yes in S1004), the controller 180 detects whether an input is applied via the secondary sensing unit 143. If the input is applied via the secondary sensing unit 143 (Yes in S1005), the controller 180 activates a prescribed function of an application. In the instance, the prescribed function of the application is similar to the former prescribed function mentioned in the foregoing description. If the controller 180 does not detect that the human breath is applied (No in step S1004), the controller 180 returns to step S1001.

Next, FIG. 11 is a diagram illustrating examples of the secondary sensing unit 143 according to an embodiment of the present invention. In particular, FIG. 11(a) shows an acceleration sensor 144 of the secondary sensing unit 143 being used by the controller 180 to determine an interval in which a user is shaking the mobile terminal 100. If so, the controller 180 can detect the interval, in which the user is shaking the mobile terminal 100, as the input interval 804 of the secondary sensing unit 143 shown in FIG. 9.

Referring to FIG. 11(a), in order to apply an input using breath, the user shakes the mobile terminal 100 and then blows on the sensor of the mobile terminal 100. In order to determine an end point of the input of the breath, the user can stop the shaking input detected by the secondary sensing unit 143.

FIG. 11(b) shows a squeeze sensor 145 of the secondary sensing unit 143 being used by the controller 180 to determine an interval in which the user squeezes the mobile terminal 100 as the input interval 804 of the secondary sensing unit 143 shown in FIG. 9. Referring to FIG. 11(b), in order to apply an input using their breath, the user squeezes the mobile terminal 100 and then blows on the sensor of the mobile terminal 100. In order to determine an end point of the input of the breath, the user can stop squeezing the mobile terminal 100. The user can also select an input button on the mobile terminal.

In the following description, examples of a prescribed function of a mobile terminal or an application, which is activated using a humidity sensor and a secondary sensing unit 143, are explained.

Figure 12:
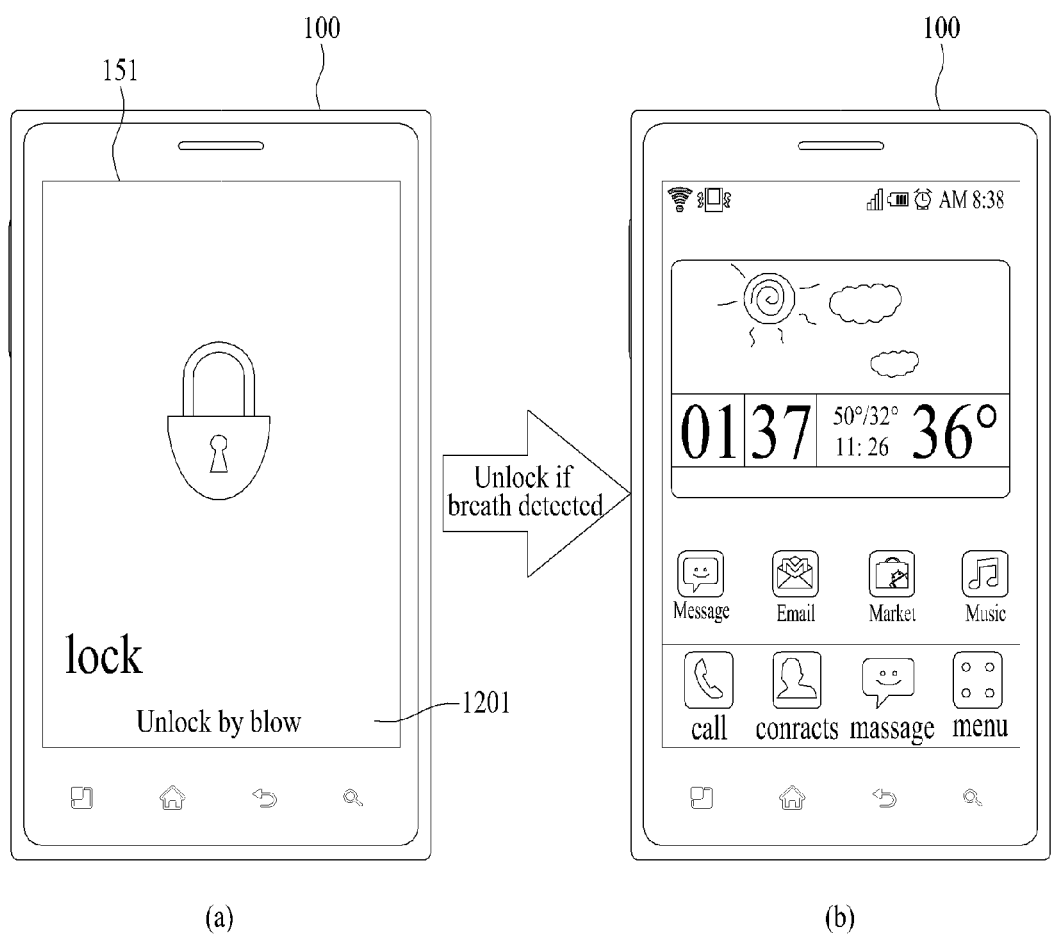
FIG. 12 is a diagram illustrating a method of cancelling a lock of a mobile terminal according to one embodiment of the present invention.

FIG. 12 is a diagram illustrating a method of cancelling a lock function of a mobile terminal according to one embodiment of the present invention. That is, mobile terminals including touch screens can be locked to prevent illegal or unwanted use of a mobile terminal. According to an embodiment of the present invention shown in FIG. 12, the controller 180 detects the human breath and cancels a lock of a touchscreen.

In particular, FIG. 12(a) shows a status of the display unit 151 of the mobile terminal 100. When the screen is locked, the controller 180 outputs a screen indicating the screen is locked on the display unit 151 together with an announcement 1201 indicating a method of cancelling the lock screen.

While the screen is locked, and if the controller 180 detects that user's breath is applied, the controller 180 cancels the locked state and then displays a home screen (FIG. 12(b)). When the lock is cancelled by detecting the human breath, the user can unlock the screen with various input methods. Thus, when the display 151 includes an electrostatic touchscreen, and the user is wearing gloves or cannot manipulate the electrostatic touchscreen, the cancellation of the locked state can be more conveniently performed.

Further, the user can set how many blowing actions are needed to unlock the screen. For example, the user can set three short breaths, a long breath, etc. for unlocking the terminal. Thus, the user can still maintain the desired privacy they want.

Figure 13:
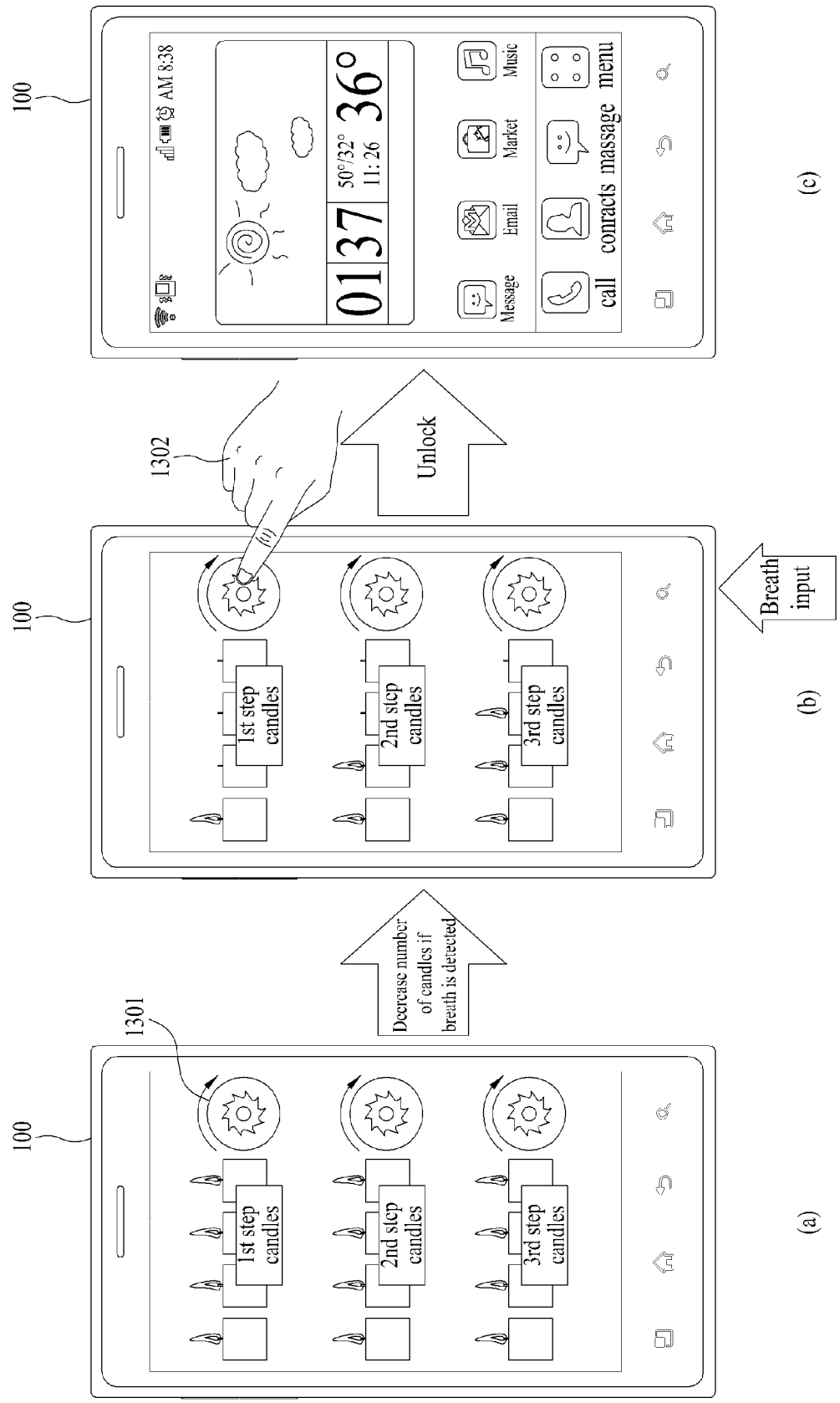
FIG. 13 is a diagram illustrating a method of cancelling a lock of a mobile terminal according to one embodiment of the present invention.

Next, FIG. 13 is a diagram illustrating a method of cancelling a lock of a mobile terminal according to another embodiment of the present invention. In particular, FIG. 13(a) shows a status of the display unit 151 in a locked state. This status diagram shows that four candles lights are lit on each of 3 steps. In addition, a candlelight extinguishing object 1301 is displayed on each of the steps.

The candlelight extinguishing object 1301 is used to decrease the number of candles on the corresponding step. In more detail, while the candlelight extinguishing object 1301 is active, a user can decrease the number of the lit candles on the corresponding step. For instance, while the candlelight extinguishing object 1301 is touched with a finger 1302, the candlelight extinguishing object 1301 can be activated.

While the candlelight extinguishing object 1301 is active, and if the user's breath is input, the candlelight on the corresponding step is displayed as being extinguished. In the following description, an operation of extinguishing the candlelight by the controller 180 is represented as extinguishing the candlelight.

According to the embodiment of the present invention described with reference to FIG. 13, the number of the candles extinguished by the controller 180 in the active state of each of the candlelight extinguishing objects 1301 may vary depending on a time for which human breath is applied. For instance, referring to FIG. 13(*b*), the candlelight extinguishing object 1301 on the first step is active by being touched with the finger 1302 of the user.

While the candlelight extinguishing object 1301 on the first step is active, and if the breath of the user is detected, the controller 180 can display the lit candles on the first step as being extinguished one by one. In doing so, the number of the lit candles extinguished by the controller 180 may be determined depending on the time for which the breath is applied. For instance, the controller 180 controls the lit candles to be extinguished one by one in response to the applied breath. When the lit candles are extinguished as many as the user wants, the user can stop breathing on the terminal 100.

If the number of the lit candles remaining on each of the steps matches a preset number, the controller 180 can unlock the locked screen. In particular, using the number of the candles extinguished on each of the steps, the locked screen can be encrypted. For instance, referring to FIG. 13(*b*), the preset number of the lit candles on the first step is one, the preset number of the lit candles on the second step is two, and the preset number of the lit candles on the third step is three. If the number of the lit candles on each of the steps is equal to the preset number of the lit candles, the controller unlocks the locked screen and then displays the home screen shown in FIG. 13(*c*).

The number of unlit (or lit) candles may also be set to correspond to a security code, such as 2 1 3. Thus, 2 unlit candles in the first step, 1 unlit candle in the second step, and 3 unlit candles in the third step would unlock the screen. In addition, the time for applying the breath in FIG. 13 may be determined by the method mentioned with reference to FIGS. 9 to 11.

Figure 14:
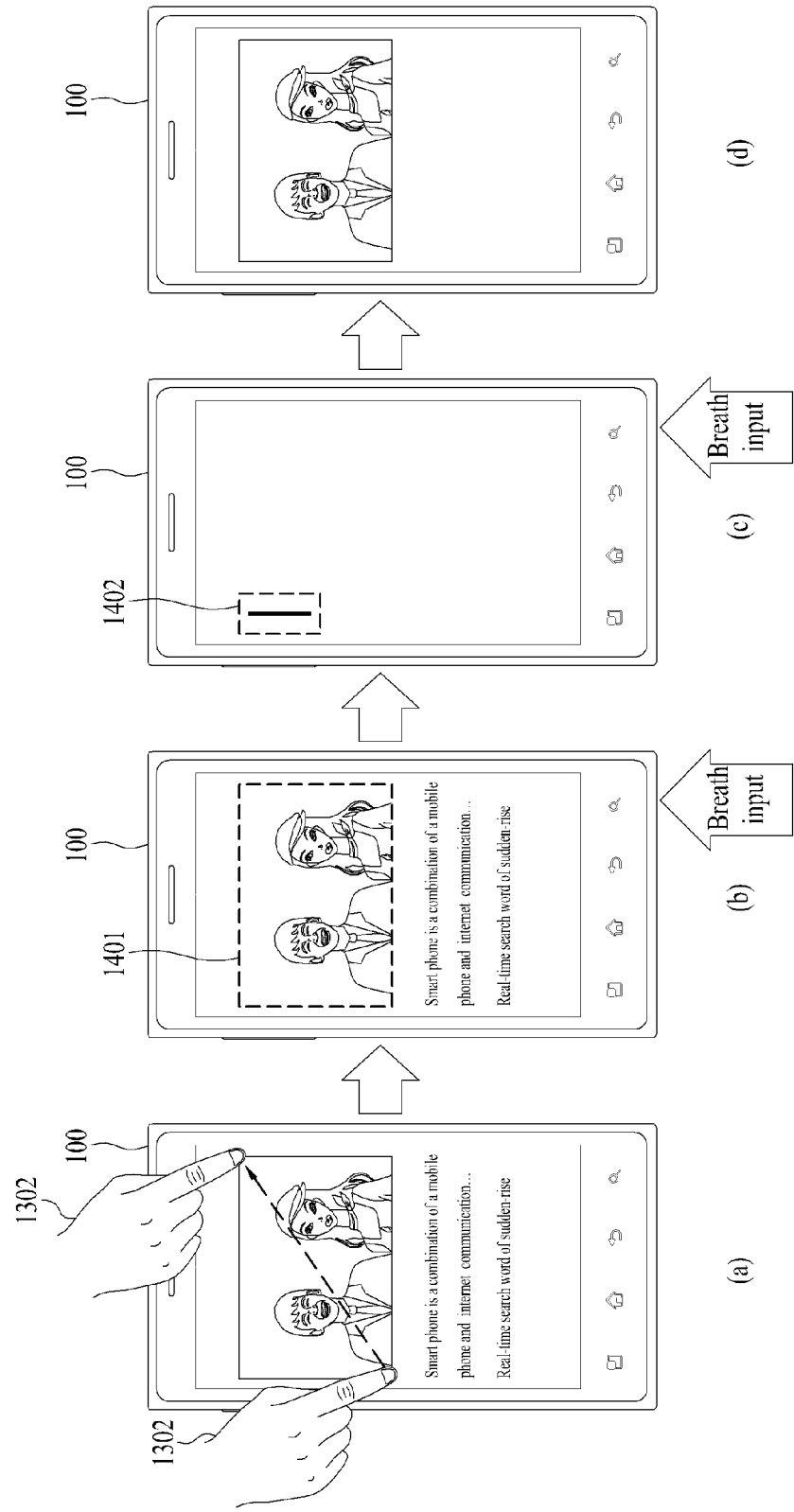
FIG. 14 is a diagram illustrating activating a prescribed function of an application in response to a detected human breath according to one embodiment of the present invention.

Next, FIG. 14 is a diagram illustrating activating a prescribed function of an application in response to a detected human breath according to another embodiment of the present invention. In FIG. 14(*a*), the mobile terminal 100 is displaying a photo object and a text object via the display unit 151. A user can select the photo object or the text object via a specific touch gesture. For instance, the specific touch gesture includes a touch & drag input performed from one corner of an object, which is to be selected, to an opposed corner (FIG. 14(*a*)).

Referring to FIG. 14(*b*), the controller 180 can output an indicator 1401 of a preset type to the selected object. In particular, the indicator 1401 may have one of various types capable of indicating that the corresponding object is selected. For instance, the indicator 1401 includes a closed curve or border enclosing an outline of the corresponding object.

Thus, while the specific object is selected, and if the controller 180 detects human breath, the controller 180 can copy the selected object. While the copied object exists, and if the human breath is detected, the controller 180 can paste the copied object. Hence, while a cursor 1402 is output to enable data to be input to a specific document or webpage (FIG. 14(*c*)), and if the user's breath is detected, the controller 180 can paste the copied object on a location of the cursor 1402 (FIG. 14(*d*)).

Figure 15:
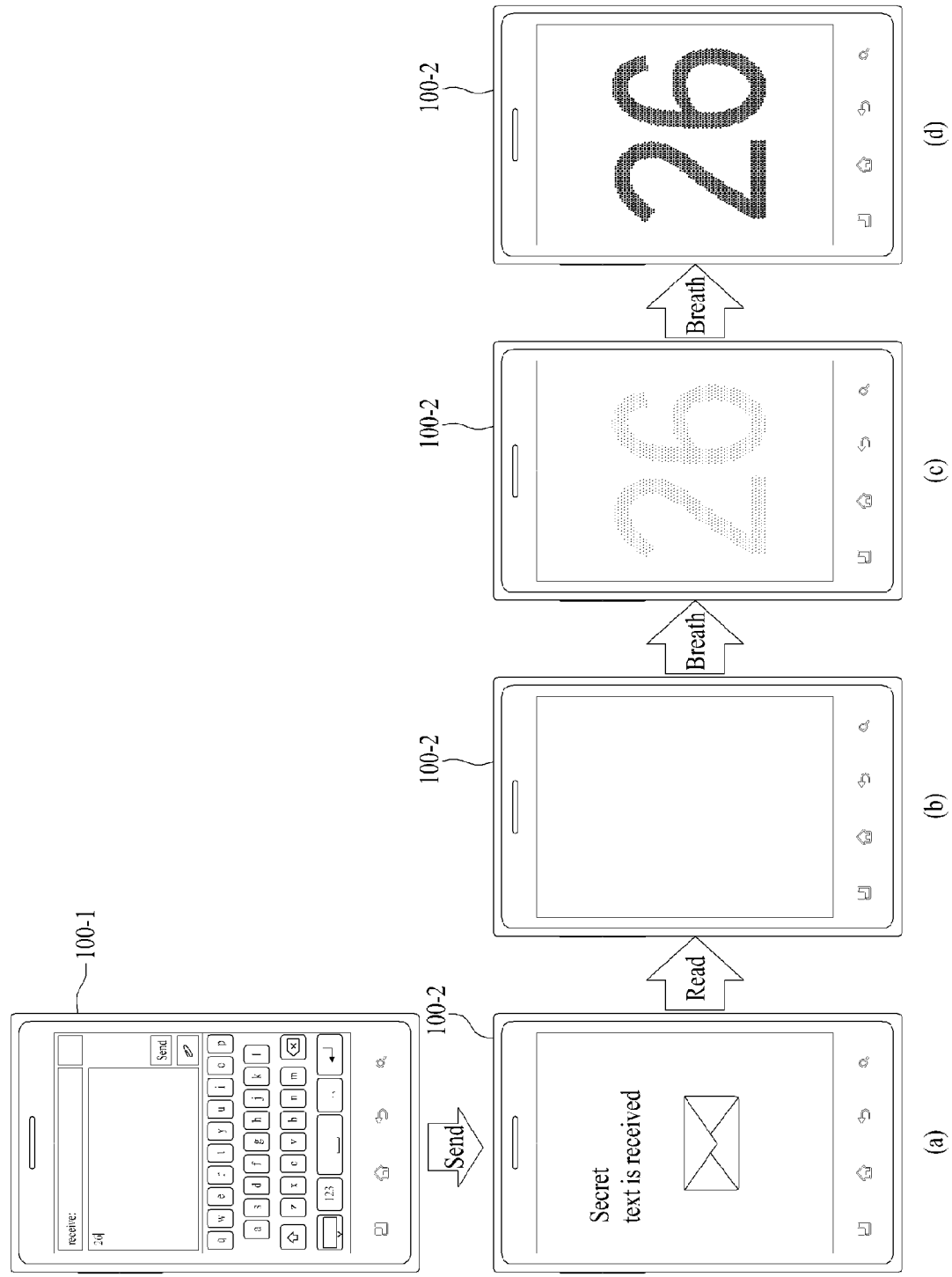
FIG. 15 is a diagram illustrating activating a prescribed function of an application in response to a detected human breath according to another embodiment of the present invention.

Next, FIG. 15 is a diagram illustrating activating a prescribed function of an application in response to a detected human breath according to yet another embodiment of the present invention. According to this embodiment, the mobile terminal 100 can have a function of writing a secret text. In this embodiment, a secret text message includes a message that can be read on a mobile terminal 100-2 having received the corresponding message based a specific input only instead of being directly displayed on the mobile terminal 100-2.

Referring to FIG. 15, a first mobile terminal 100-1 writes a secret text containing a content of a numeral 26 and then sends the written message to a second mobile terminal 100-2. FIG. 15(*a*) shows that the second mobile terminal 100-2 has received the secret text. If a user of the second mobile terminal 100-2 attempts to read the secret message in a normal manner, no message is displayed on the second mobile terminal 100-2 (FIG. 15(*b*)).

However, if the controller 180 detects the user's breath (FIG. 15(*b*)), the content of the secret message may gradually appear (FIG. 15(*c*)). If the breath is further detected (FIG. 15(*c*)), the controller 180 visually display the content of the secret message as getting thicker.

According to the embodiment of the present invention, the mobile terminal 100 may further include a function of writing a secret memo and a function of reading a secret memo. In this instance, like the secret message, the secret memo corresponds to contents of the memo being gradually output when the user's breath is detected. Because the secret memo is similar to that of the secret message, its details are omitted. Meanwhile, the time for which the breath is detected may use the former time described with reference to FIGS. 9 to 11.

Figure 16:
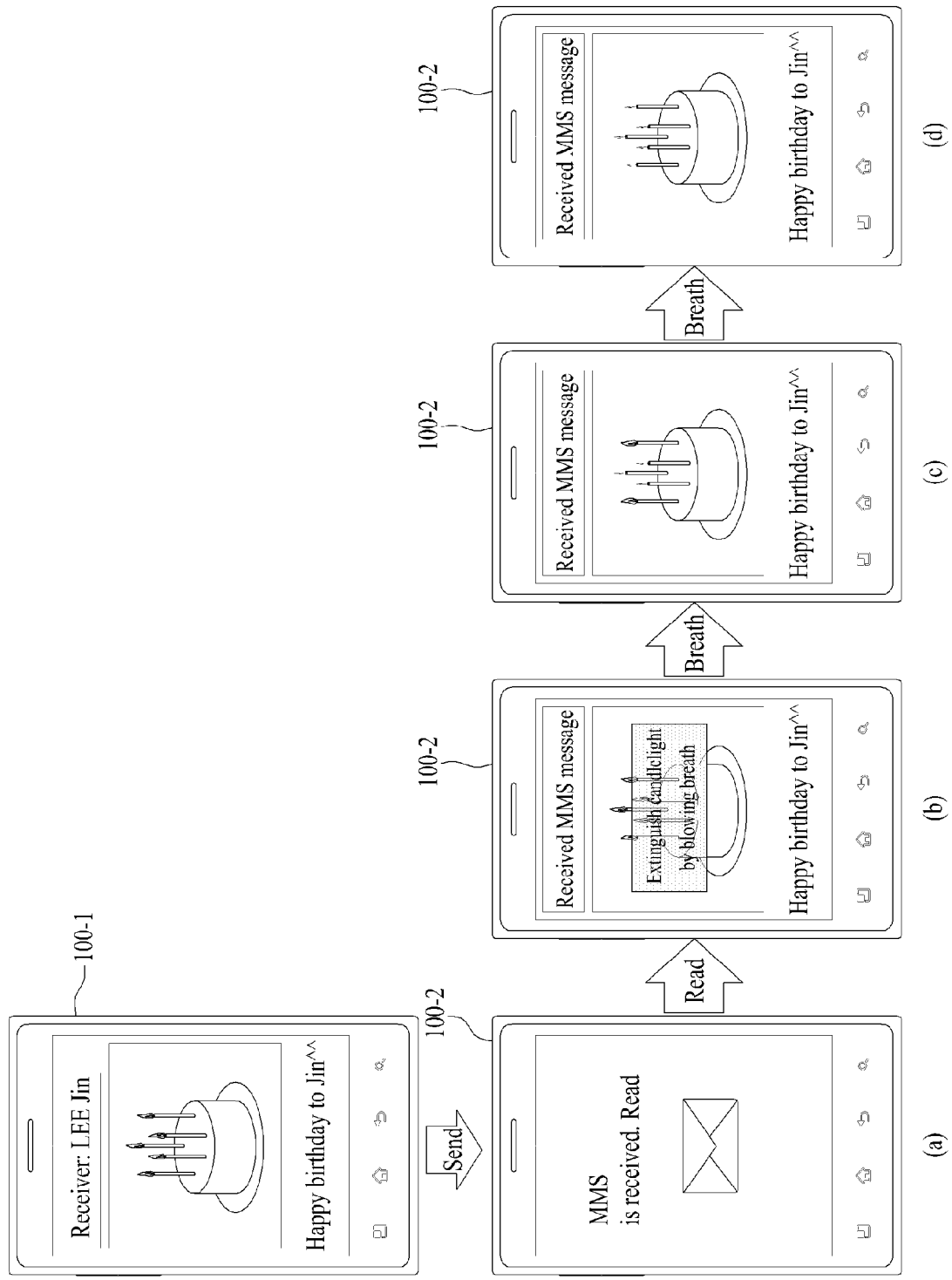
FIG. 16 is a diagram illustrating activating a prescribed function of an application in response to a detected human breath according to yet another embodiment of the present invention.

Next, FIG. 16 is a diagram illustrating activating a prescribed function of an application in response to a detected human breath according to still another embodiment of the present invention. Referring to FIG. 16(*a*), a birthday congratulation message is set via MMS (multimedia message service) from a first mobile terminal 100-1 to a second mobile terminal 100-2. According to an embodiment of the present invention, the mobile terminal 100 can write and send an MMS message that can respond to a detected breath.

Referring to FIG. 16(*b*), the controller 180 of the receiving mobile terminal 100-2 outputs the received MMS message. In addition, the controller 180 of the receiving mobile terminal 100-2 can output an announcement text 1601 indicating that candlelight can be extinguished if breath is blown together with the received MMS message.

While the received MMS message is output, and if the user's breath is detected, the controller 180 of the receiving mobile terminal 100-2 can output an MMS message modified in response to the detected breath. For instance, while an MMS message containing a birthday cake content is output, the controller 180 can output an effect that candlelight on the output birthday cake is extinguished in response to the breath input.

Moreover, the controller 180 of the receiving mobile terminal 100-2 can control the MMS message to be modified differently depending on a time for which the breath detection is maintained. For instance, the number of the candles extinguished on the birthday cake sent by being contained in a birthday congratulation message can be determined depending on the time for which the breath detection is maintained. In particular, the controller 180 can output an effect that one lighted candle is extinguished each time the breath detected time reaches 1 second. Meanwhile, the time for which the breath is detected in FIG. 16 may use the former time described with reference to FIGS. 9 to 11.

Figure 17:
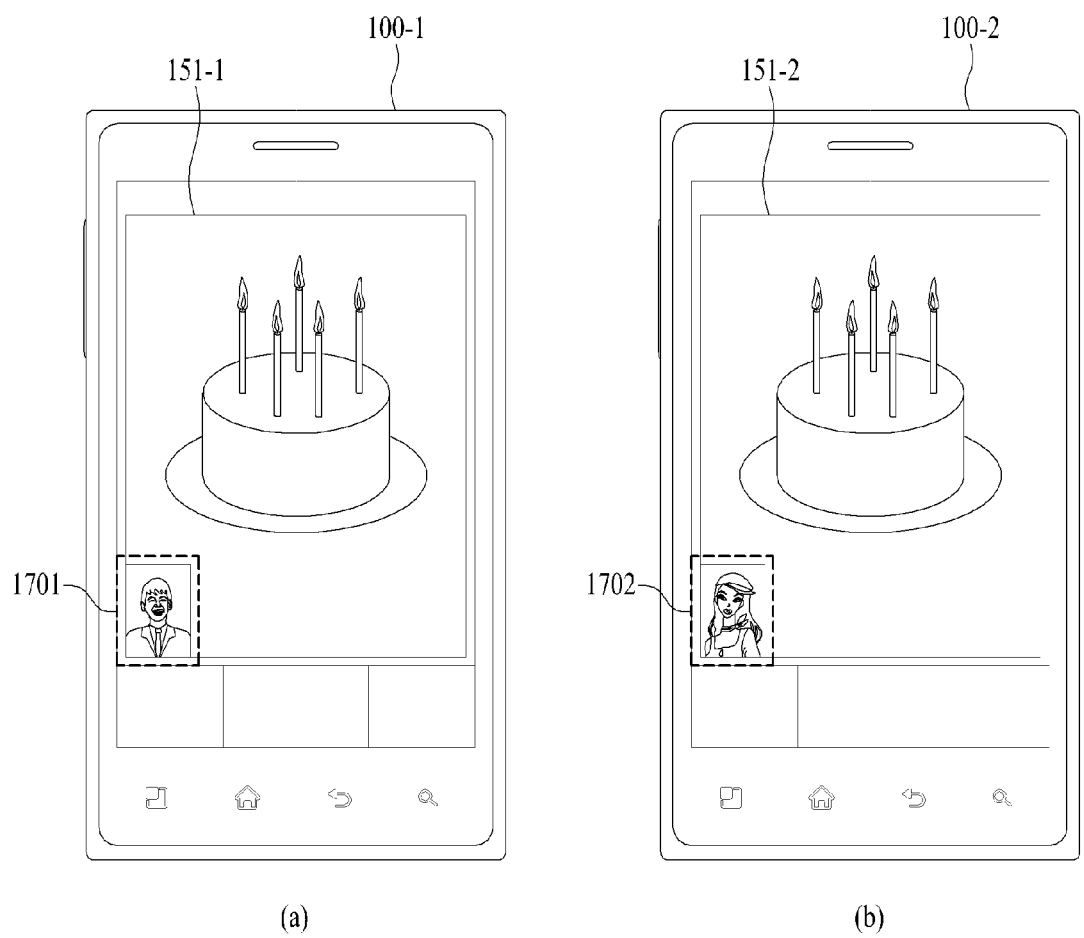
FIG. 17 is a diagram illustrating activating a prescribed function of an application in response to a detected human breath according to one embodiment of the present invention.

Next, FIG. 17 is a diagram illustrating activating a prescribed function of an application in response to a detected human breath according to another embodiment of the present invention. In particular, FIG. 17(*a*) shows a first mobile terminal 100-1 having a video call connection, and FIG. 17(*b*) shows a second mobile terminal 100-2 having the video call connection.

According to this embodiment of the present invention, a birthday cake content can be sent to the second mobile terminal 100-2 from the first mobile terminal 100-1 in the middle of a video call. If so, while a counterpart face of the video call is output to a first region 1701 of the first mobile terminal 100-1, the controller 180-1 of the first mobile terminal 100-1 can output the birthday cake content to the rest of the display unit 151-1 except the first region 1701.

While a counterpart face of the video call is output to a second region 1702 of the second mobile terminal 100-2, the controller 180-2 of the second mobile terminal 100-2 can output the birthday cake content to the rest of the display unit 141-2 except the second region 1702. The user of the second mobile terminal 100-2 having received the birthday cake content can extinguish the candlelight on the birthday cake content by blowing breath on the sensing unit 140-2 of the second mobile terminal 100-2.

In particular, while the birthday cake content is output, if the user's breath is detected, the controller 180-2 of the second mobile terminal 100-2 can output an effect that the candlelight on the output birthday cake content is extinguished in response to the detected user's breath. Therefore, according to the embodiment of the present invention, the user can advantageously experience such an effect as if extinguishing the real candlelight on a birthday cake.

Meanwhile, the time for which the breath is detected and the number of the extinguished lit candles may use the time and number similar to those described with reference to FIG. 16. In addition, the time for which the breath is detected may use the former method described with reference to FIGS. 9 to 11.

Further, the embodiment of the present invention may be applicable to a multi-user video call as well as to the 1-to-1 video call shown in FIG. 17. In this instance, it can extinguish the candlelight, which is on the birthday cake received by the mobile terminal 100, by inputting breath to the mobile terminal 100 having received the birthday cake. If the candlelight is extinguished, the rest of the counterparts in the video chat can confirm that the candlelight is extinguished.

Figure 18:
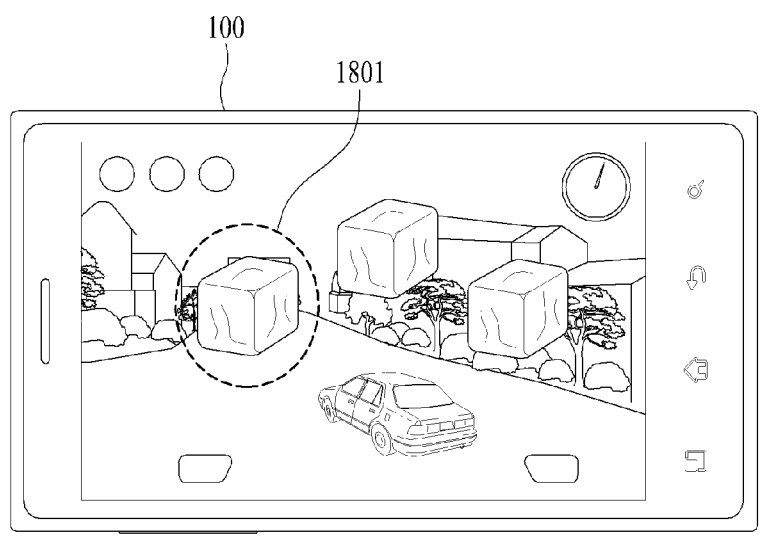
FIG. 18 is a diagram illustrating activating a prescribed function of an application in response to a detected human breath according to another embodiment of the present invention.

Next, FIG. 18 is a diagram illustrating activating a prescribed function of an application in response to a detected human breath according to yet another embodiment of the present invention. Referring to FIG. 18, a game application is active in the mobile terminal 100. According to this embodiment, the controller 180 can utilize a humidity sensor as an input mechanism of the game application. In particular, a user can control a game using breath.

For instance, the controller 180 can output an ice obstacle 1801 to an active game screen. The output ice obstacle 1801 needs to be removed to play the game and can be removed by the user's breath. Hence, if the user's breath is detected, the controller 180 can remove the ice obstacle 1801. In particular, the controller 180 can determine the number of the ice obstacles 1801 to be removed in proportion to a time for which the breath is detected.

In addition, in still an alternative embodiment, the user can blow on the mobile terminal 100 to invoke a camera function. For example, a mom may want to take a picture of her lying on a couch with her son. In this example, the mom holds the mobile terminal 100 a distance away from her face and her child's face lying on the couch. It is thus very inconvenient to reach out and press the shutter button on the camera function to take a picture. However, in the present invention, the user can blow on the terminal to activate the camera shutter in a predetermined amount of time such as 10 seconds, 15 seconds, etc. Thus, the mom can blow on the terminal, move the terminal a predetermined distance away, and have the camera take the picture automatically in 10 seconds, etc.

Accordingly, embodiments of the present invention provide several advantages. For example, according to at least one of embodiments of the present invention, the user can control a mobile terminal more conveniently using a temperature sensor and a humidity sensor.

Also, an accuracy of a corresponding blowing interval can be increased, when an interval for recognizing the human breath using a secondary sensor for assisting a temperature/humidity sensor.

In addition, the above-described methods can be implemented in a program recorded medium as computer-readable codes. The computer-readable media includes all kinds of recording devices in which data readable by a computer system are stored. The computer-readable media includes ROM, RAM, CD-ROM, magnetic tapes, floppy discs, optical data storage devices, and the like for example and also include carrier-wave type implementations (e.g., transmission via Internet). Further, the computer includes the controller 180 of the terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
 a wireless communication unit configured to wirelessly communicate with at least one other terminal;
 a touchscreen configured to display an unlock object and a plurality of display objects when the touchscreen is locked;
 a first sensor configured to detect a blowing action on the mobile terminal;
 a second sensor configured to detect an input action of a user including a touch action on the unlock object; and
 a controller configured to:

execute a prescribed function on the mobile terminal when detecting the blowing action on the mobile terminal while the input action of the user is detected, wherein the prescribed function includes:
- removing or changing at least a portion of the display objects based on the blowing action while the input action is being performed on the unlock object; and
- unlocking the touchscreen when a number of the removed or changed display objects equals a predetermined set number.

2. The mobile terminal of claim 1, wherein the second sensor includes at least one of an acceleration sensor configured to detect a movement of the mobile terminal and a pressure sensor configured to detect a squeezing or pressing of the mobile terminal.

3. The mobile terminal of claim 1, wherein the controller is further configured to:
- arrange at least one virtual step on the touchscreen and display the unlock object and a plurality of display objects on each virtual step, and
- remove at least a portion of the display objects in a first virtual step based on the blowing action while the input action is being performed on the unlock object of the first virtual step.

4. The mobile terminal of claim 3, wherein the plurality of display objects include images of lit candles, and the blowing action extinguishes flames of the lit candles, and
wherein when the number of unlit candles matches the predetermined set number, the controller unlocks the touchscreen.

5. The mobile terminal of claim 1, wherein the prescribed function further includes copying and pasting a prescribed content displayed on a touchscreen of the mobile terminal.

6. The mobile terminal of claim 1, wherein the prescribed function further includes gradually outputting contents of a received message in response to the input action and the blowing action.

7. A method of controlling a mobile terminal, the method comprising:
- displaying an unlock object and a plurality of display objects when the touchscreen is locked on a touch screen;
- detecting, via a first sensor of the mobile terminal, a blowing action on the mobile terminal;
- detecting, via a second sensor of the mobile terminal, an input action of a user including a touch action on the unlock object;
- executing, via a controller of the mobile terminal, a prescribed function on the mobile terminal when detecting the blowing action on the mobile terminal while the input action of the user is detected, wherein the prescribed function includes:
- removing or changing at least a portion of the display objects based on the blowing action while the input action is being performed on the unlock object; and
- unlocking the touchscreen when a number of the removed or changed display objects equals a predetermined set number.

8. The method of claim 7, wherein the second sensor includes at least one of an acceleration sensor configured to detect a movement of the mobile terminal and a pressure sensor configured to detect a squeezing or pressing of the mobile terminal.

9. The method of claim 7, further comprising:
- arranging, via the controller, at least one virtual step on the touchscreen and displaying the unlock object and a plurality of display objects on each virtual step; and
- removing, via the controller at least a portion of the display objects in a first virtual step based on the blowing action while the input action is being performed on the unlock object of the first virtual step.

10. The method of claim 9, wherein the plurality of display objects include images of lit candles, and the blowing action extinguishes flames of the lit candles, and
wherein when the number of unlit candles matches the predetermined set number, the touchscreen is unlocked.

11. The method of claim 7, wherein the prescribed function further includes copying and pasting a prescribed content displayed on a touchscreen of the mobile terminal.

12. The method of claim 7, wherein the prescribed function further includes gradually outputting contents of a received message in response to the input action and the blowing action.

* * * * *